(12) United States Patent
Nagata et al.

(10) Patent No.: US 10,057,040 B2
(45) Date of Patent: Aug. 21, 2018

(54) WIRELESS COMMUNICATION SYSTEM, BASE STATION APPARATUS, USER TERMINAL, AND CHANNEL STATE INFORMATION MEASUREMENT METHOD

(71) Applicant: NTT DOCOMO, INC., Tokyo (JP)

(72) Inventors: Satoshi Nagata, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 323 days.

(21) Appl. No.: 14/375,151

(22) PCT Filed: Jan. 30, 2013

(86) PCT No.: PCT/JP2013/052062
§ 371 (c)(1),
(2) Date: Jul. 29, 2014

(87) PCT Pub. No.: WO2013/115258
PCT Pub. Date: Aug. 8, 2013

(65) Prior Publication Data
US 2014/0369224 A1    Dec. 18, 2014

(30) Foreign Application Priority Data

Jan. 30, 2012  (JP) ................................ 2012-017278

(51) Int. Cl.
*H04L 5/00* (2006.01)
*H04J 11/00* (2006.01)
*H04W 24/08* (2009.01)

(52) U.S. Cl.
CPC ........ *H04L 5/0057* (2013.01); *H04J 11/0053* (2013.01); *H04L 5/005* (2013.01);
(Continued)

(58) Field of Classification Search
CPC ... H04L 5/0057; H04L 5/0033; H04L 5/0035; H04L 5/005; H04L 5/0053; H04J 11/0053; H04W 24/08
See application file for complete search history.

(56) References Cited

U.S. PATENT DOCUMENTS

2013/0010750 A1   1/2013  Hoshino et al.
2013/0033998 A1   2/2013  Seo et al.
(Continued)

FOREIGN PATENT DOCUMENTS

| CA | 2784035 A1 | 10/2011 |
| JP | 2012-005073 A | 1/2012 |
| WO | 2011/118141 A1 | 9/2011 |

OTHER PUBLICATIONS

Office Action in counterpart Japanese Patent Application No. 2012-017278, dated Jan. 21, 2014 (5 pages).
(Continued)

*Primary Examiner* — Melvin Marcelo
(74) *Attorney, Agent, or Firm* — Osha Liang LLP

(57) ABSTRACT

The present invention is designed to provide a wireless communication system, a base station apparatus, a user terminal, and a channel state information measurement method that can allow a user terminal to feed back channel quality information that is optimal for a transmission mode from a plurality of transmission points. A wireless communication system according to the present invention provides a base station apparatus having a determining section that determines resource information about resources to allocate the reference signal for measuring desired signals to, and resource for measuring interference signals, and a reporting section that reports the resource information to the user terminal, and the user terminal having a receiving section that receives the reported resource information, a measurement section that measures desired signals and interference
(Continued)

signals based on the resource information, and a measurement section that measures the channel state using the measurement results of the measurement section.

11 Claims, 14 Drawing Sheets

(52) U.S. Cl.
CPC .......... *H04L 5/0033* (2013.01); *H04L 5/0035* (2013.01); *H04L 5/0053* (2013.01); *H04W 24/08* (2013.01)

(56) References Cited

U.S. PATENT DOCUMENTS

2013/0114428 A1* 5/2013 Koivisto ................ H04B 7/024
370/252
2013/0156015 A1  6/2013 Abe et al.

OTHER PUBLICATIONS

Decision to Grant a Patent in counterpart Japanese Patent Application No. 2012-017278, dated Apr. 1, 2014 (4 pages).
3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).
International Search Report for corresponding International Application No. PCT/JP2013/052062, dated Jan. 30, 2013 (2 pages).
Extended Search Report issued in corresponding European Application No. 13743296.9, dated Aug. 13, 2015 (7 pages).
3GPP TR 36.819 V11.1.0; "3rd Generation Partnership Project; Technical Specification Group Radio Access Network; Coordinated multi-point operation for LTE physical layer aspects (Release 11);" Dec. 2011 (69 pages).
Renesas Mobile Europe Ltd.; "Evaluation of interference measurement schemes"; 3GPP TSG-RAN WG1 Meeting #67, R1-114399; San Francisco, USA; Nov. 14-18, 2011 (7 pages).
Samsung; "Interference Measurement for Downlink CoMP"; 3GPP TSG RAN WG1 #67, R1-114228; San Francisco, USA; Nov. 14-18, 2011 (4 pages).
ZTE; "Discussion and Evaluation on interference measurement"; 3GPP TSG-RAN WG1 Meeting #67, R1-113773; San Francisco, USA; Nov. 14-18, 2011 (8 pages).
Office Action issued in the counterpart Canadian Patent Application No. 2862094, dated Dec. 29, 2016 (5 pages).
Office Action in counterpart European Patent Application No. 13743296.9, dated Oct. 28, 2016 (6 pages).
Notice of Preliminary Rejection (Office Action) dated Jan. 26, 2017, issued by the Korean Intellectual Property Office in corresponding Korean Patent Application No. KR 10-2014-7020170, with English translation (10 pages).
Ericsson , ST-Ericsson, "Discussions on DL CoMP Schemes", 7.5.1; 3GPP TSG-RAN WG1 #66bis, R1-113353, Zhuhai, China, Oct. 5, 2011 (4 pages).
Office Action issued in the counterpart Korean Patent Application No. KR10-2014-7020170, dated Jul. 20, 2017 (8 pages).
Office Action issued in the counterpart Chinese Patent Application No. 201380007298.2, dated Jul. 21, 2017 (14 pages).
Office Action issued in the counterpart Canadian Patent Application No. 2862094, dated Aug. 21, 2017 (4 pages).
Office Action issued in corresponding European Application No. 13743296.9, dated Mar. 1, 2018 (6 pages).

* cited by examiner

| IMR#1 | IMR#2 | |
|---|---|---|
| 1 | 0 | MEASURE CSI WITH SMR #1 + IMR #1 |
| 0 | 1 | MEASURE CSI WITH SMR #2 + IMR #2 |
| 1 | 1 | MEASURE TWO TYPES OF CSIs WITH SMR #1 + IMR #1 AND SMR #2 + IMR #2 |
| 0 | 0 | MEASUREMENT METHOD (FOR EXAMPLE, CRS BASED INTERFERENCE ESTIMATION) |

FIG.8

| SMR#1 | SMR#2 | IMR#1 | IMR#2 | |
|---|---|---|---|---|
| 1 | 0 | 1 | 0 | MEASURE CSI WITH SMR #1 + IMR #1 |
| 0 | 1 | 0 | 1 | MEASURE CSI WITH SMR #2 + IMR #2 |
| 1 | 0 | 0 | 0 | MEASURE CSI WITH SMR #1 AND A CONVENTIONAL INTERFERENCE MEASUREMENT METHOD (FOR EXAMPLE, CRS BASED INTERFERENCE MEASUREMENT) |
| 1 | 0 | 1 | 1 | MEASURE TWO TYPES OF CSIS WITH SMR #1 + IMR #1 AND SMR #1 + IMR #2 |
| 1 | 1 | 0 | 1 | MEASURE TWO TYPES OF CSIS WITH SMR #1 + IMR #2 AND SMR #2 + IMR #2 |
| 1 | 1 | 1 | 1 | MEASURE FOUR TYPES OF CSIS WITH SMR #1 + IMR #1, SMR #1 + IMR #2, SMR #2 + IMR #1, AND SMR #2 + IMR #2 |

FIG.9

WIRELESS COMMUNICATION SYSTEM, BASE STATION APPARATUS, USER TERMINAL, AND CHANNEL STATE INFORMATION MEASUREMENT METHOD

TECHNICAL FIELD

The present invention relates to a wireless communication system, a base station apparatus, a user terminal, and a channel state information measurement method in a next-generation mobile communication system.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, long-term evolution (LTE) is under study for the purposes of further increasing high-speed data rates, providing low delay, and so on (non-patent literature 1).

In the third-generation system, a transmission rate of maximum approximately 2 Mbps can be achieved on the downlink by using a fixed band of approximately 5 MHz. Meanwhile, in an LTE system, it is possible to achieve a transmission rate of about maximum 300 Mbps on the downlink and about 75 Mbps on the uplink by using a variable band which ranges from 1.4 MHz to 20 MHz. Furthermore, with the UMTS network, a successor system of an LTE system is also under study for the purpose of achieving further broadbandization and higher speed (for example, referred to as "LTE advanced" or may be referred to as "LTE enhancement" (hereinafter ("LTE-A")).

In the downlink of an LTE system (for example, Rel. 8 LTE), CRSs (Cell-specific Reference Signals), which are associated with cell IDs, are defined. These CRSs are used to demodulate user data, and, besides, used to measure downlink channel quality (CQI: Channel Quality Indicator) for scheduling and adaptive control, and so on. Meanwhile, in the downlink of the successor system (for example, Rel. 10 LTE) of LTE, a CSI-RS (Channel State Information-Reference Signal) is under study for dedicated use of CSI (Channel State Information) measurement.

CITATION LIST

Non-Patent Literature

Non-Patent Literature 1: 3GPP, TR25.912 (V7.1.0), "Feasibility Study for Evolved UTRA and UTRAN," September 2006

SUMMARY OF INVENTION

Technical Problem

Now, as a promising technique for further improving the system performance of an LTE system, there is inter-cell orthogonalization. For example, in an LTE-A system, intra-cell orthogonalization is made possible by orthogonal multiple access on both the uplink and the downlink. That is to say, on the downlink, orthogonalization is provided between user terminals UE (User Equipment) in the frequency domain. On the other hand, between cells, like in W-CDMA, interference randomization by one-cell frequency reuse is fundamental.

So, in the 3GPP (3rd Generation Partnership Project), coordinated multiple-point transmission/reception (CoMP) techniques are under study as techniques for realizing inter-cell orthogonalization. In this CoMP transmission/reception, a plurality of cells coordinate and perform signal processing for transmission and reception for one user terminal UE or for a plurality of user terminals UE. By adopting these CoMP transmission/reception techniques, improvement of throughput performance is expected, especially with respect to user terminals UE located on cell edges.

In this way, in an LTE-A system, in addition to the mode of transmission to transmit from one transmission point to user terminals, there is also a mode of transmission to transmit from a plurality of transmission points to user terminals, so that it is necessary to make user terminals feed back optimal channel quality information (CSI) for each transmission mode.

The present invention has been made in view of the above, and it is therefore an object of the present invention to provide a wireless communication system, a base station apparatus, a user terminal, and a channel state information measurement method which can allow a user terminal to feed back channel quality information that is optimal for a mode of transmission from a plurality of transmission points.

Solution to Problem

A wireless communication system according to the present invention has a plurality of base station apparatuses that transmit a reference signal for measuring a channel state, and a user terminal that connects with one of the plurality of base station apparatuses, and, in this wireless communication system: each base station apparatus has: a determining section that determines resource information about a resource to allocate the reference signal for measuring a desired signal to, and a resource for measuring an interference signal; and a reporting section that reports the resource information to the user terminal; and the user terminal has: a receiving section that receives the reported resource information; a measurement section that measures the desired signal and the interference signal based on the resource information; and a measurement section that measures the channel state using measurement results of the measurement section.

Technical Advantage of Invention

According to the present invention, it is possible to allow a user terminal to feed back channel quality information that is optimal for a mode of transmission from a plurality of transmission points. By this means, it is possible to improve throughput and realize a highly efficient wireless communication system.

BRIEF DESCRIPTION OF DRAWINGS

FIG. 8 is a diagram to show examples of signaling of combinations of resources for measuring desired signals and resources for measuring interference signals;

FIG. 9 is a diagram to show examples of signaling of combinations of resources for measuring desired signals and resources for measuring interference signals;

DESCRIPTION OF EMBODIMENTS

First, CSI-RS, which is one of the reference signals adopted in a successor system of LTE (for example, Rel. 10), will be described. A CSI-RS is a reference signal that is used to measure CSI, such as CQI (Channel Quality Indicator), PMI (Precoding Matrix Indicator), and RI (Rank Indicator), as the channel state. Unlike CRSs that are allocated to all subframes, CSI-RSs are allocated in a predetermined cycle—for example, in a 10-subframe cycle. Also, CSI-RSs are specified by parameters such as position, sequence and transmission power. The positions of CSI-RSs include the subframe offset, the cycle, and the subcarrier-symbol offset (index).

Note that non-zero-power CSI-RSs and zero-power CSI-RSs are defined as CSI-RSs. With non-zero-power CSI-RSs, transmission power is distributed to the resources to which the CSI-RSs are allocated, and, with zero-power CSI-RSs, transmission power is not distributed to the resources to which the CSI-RSs are allocated (that is, the CSI-RSs are "muted").

In one resource block, as defined in LTE, CSI-RSs are allocated not to overlap with control signals such as the PDCCH (Physical Downlink Control Channel), user data such as the PDSCH (Physical Downlink Shared Channel), and other reference signals such as CRSs (Cell-specific Reference Signals) and DM-RSs (Demodulation-Reference Signals). One resource block is formed with twelve subcarriers that are consecutive in the frequency direction and fourteen symbols that are consecutive in the time axis direction. From the perspective of suppressing PAPR, two resource elements that neighbor each other in the time axis direction are allocated, as a set, to resources where CSI-RSs can be allocated.

When CQIs are calculated with CSI-RSs, the accuracy of interference measurement becomes important. By using CSI-RSs, which are user-specific reference signals, CSI-RSs from a plurality of transmission points can be separated in a user terminal, so that interference measurement based on CSI-RSs is promising. However, since the density of CSI-RSs in one resource block is low according to the provisions of LTE (Rel. 10 LTE), it is not possible to measure interference from other transmission points (other cells) accurately.

Figure 1:
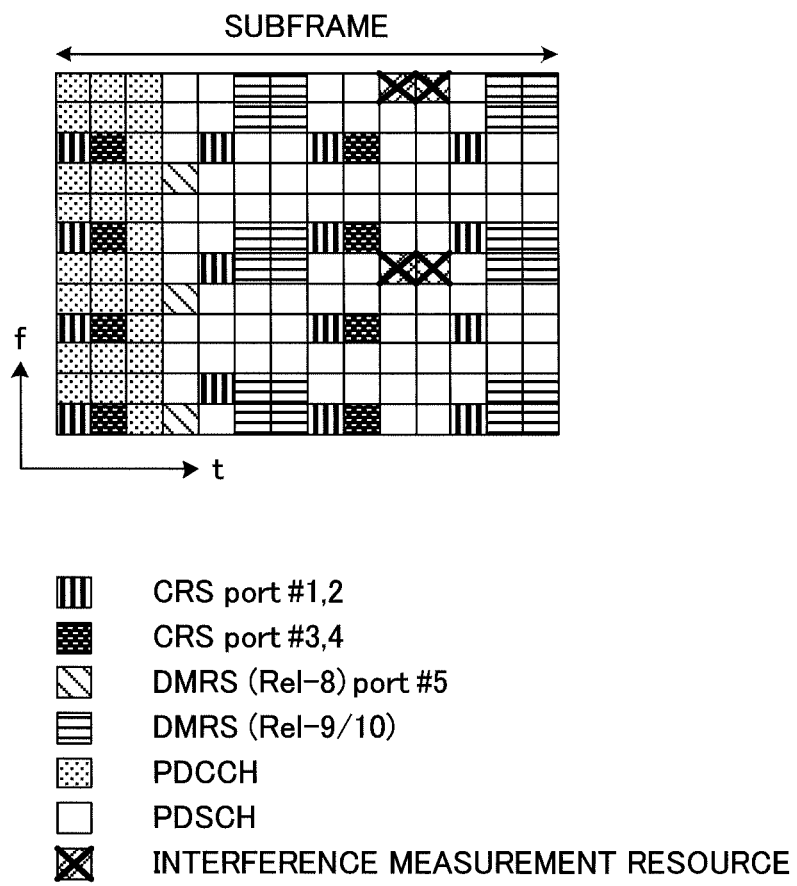
FIG. 1 is a diagram to show a CSI-RS pattern including zero-power CSI-RSs for measuring interference.

So, the applicant has proposed, as shown in FIG. 1, adding zero power CSI-RSs for use for interference measurement alone (hereinafter referred to as "interference measurement zero power CSI-RSs"), and applying shifts in the frequency axis direction so that the resources of interference measurement zero power CSI-RSs do not overlap between transmission points. By this means, it is possible to measure interference signals for calculation of CSI (Channel State Information) in user terminals, by using resource elements (REs) in which the downlink shared data channel (PDSCH) is not transmitted. In this case, interference measurement zero power CSI-RS patterns that vary for every transmission point or for every plurality of transmission points are assigned.

By this means, it is possible to measure interference using both non-zero power CSI-RSs (existing CSI-RSs with transmission power) and interference measurement zero-power CSI-RSs, increase the number of CSI-RSs that can be used for interference measurement, and improve the accuracy of interference measurement. Also, since transmission power is zero with interference measurement zero-power CSI-RSs, signal components that are received in resources where interference measurement zero power CSI-RSs are allocated can be handled on an as-is basis, as interference components, and it is therefore possible to reduce the processing load of interference measurement.

Here, an interference signal measurement method using interference measurement zero-power CSI-RSs will be described. Here, a system configuration in which two radio base stations serve as transmission point ("TP") #1 and TP #2 will be described as an example.

Figure 2A:
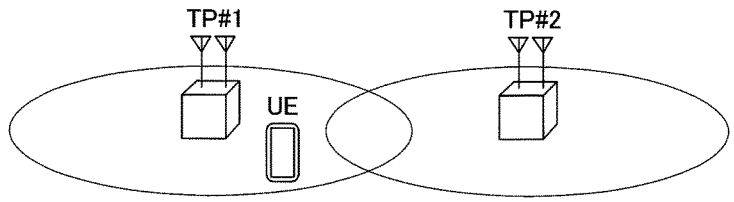
FIG. 2 provides diagram for explaining a method of measuring interference signals.
Figure 2B:
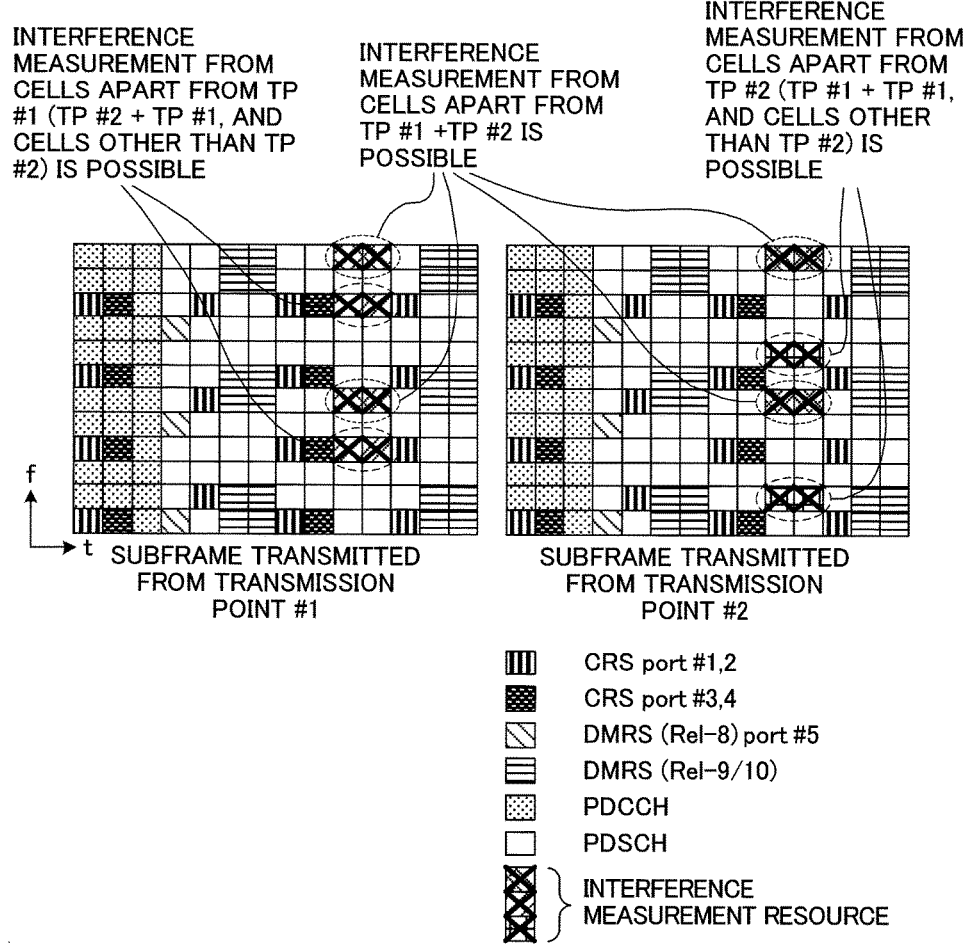

FIG. 2A shows a case where transmission is carried out from transmission points TP #1 and TP #2 to a user terminal UE. Also, FIG. 2B shows an example of CSI-RS patterns in which interference measurement zero power CSI-RSs are arranged. In FIG. 2B, the subframe on the left side is a subframe to be transmitted from TP #1, and the subframe on the right side is a subframe to be transmitted from TP #2.

As shown in FIG. 2B, if, in each subframe of TP #1 and TP #2, interference measurement zero-power CSI-RSs are arranged in the REs that are the first and seventh REs in the frequency direction and that are the tenth and eleventh REs in the time direction, the PDSCH is not transmitted (hence zero power) in these REs of TP #1 and TP #2. Consequently, in these REs, it is possible to measure interference signals from cells apart from TP #1 and TP #2. Also, as shown in FIG. 2B, if, in the subframe of TP #1, interference measurement zero power CSI-RSs are arranged in the REs that are the third and ninth REs in the frequency direction and that are the tenth and eleventh REs in the time direction, the PDSCH is not transmitted (hence zero power) in these REs of TP #1. Consequently, in these REs, it is possible to measure interference signals from apart from TP #1 (TP #2+TP #1, and cells other than TP #2). Also, as shown in FIG. 2B, if, in the subframe of TP #2, interference measurement zero power CSI-RSs are arranged in the REs that are the fifth and eleventh REs in the frequency direction and that are the tenth and eleventh REs in the time direction, the PDSCH is not transmitted (hence zero power) in these REs of TP #2. Consequently, in these REs, it is possible to measure interference signals from cells apart from TP #2 (TP #1+TP #1, and cells other than TP #2).

Next, a method of measuring desired signals using CSI-RSs will be described. Here, a system configuration in which two radio base stations serve as transmission point (TP) #1 and TP #2 will be described as an example.

Figure 3:
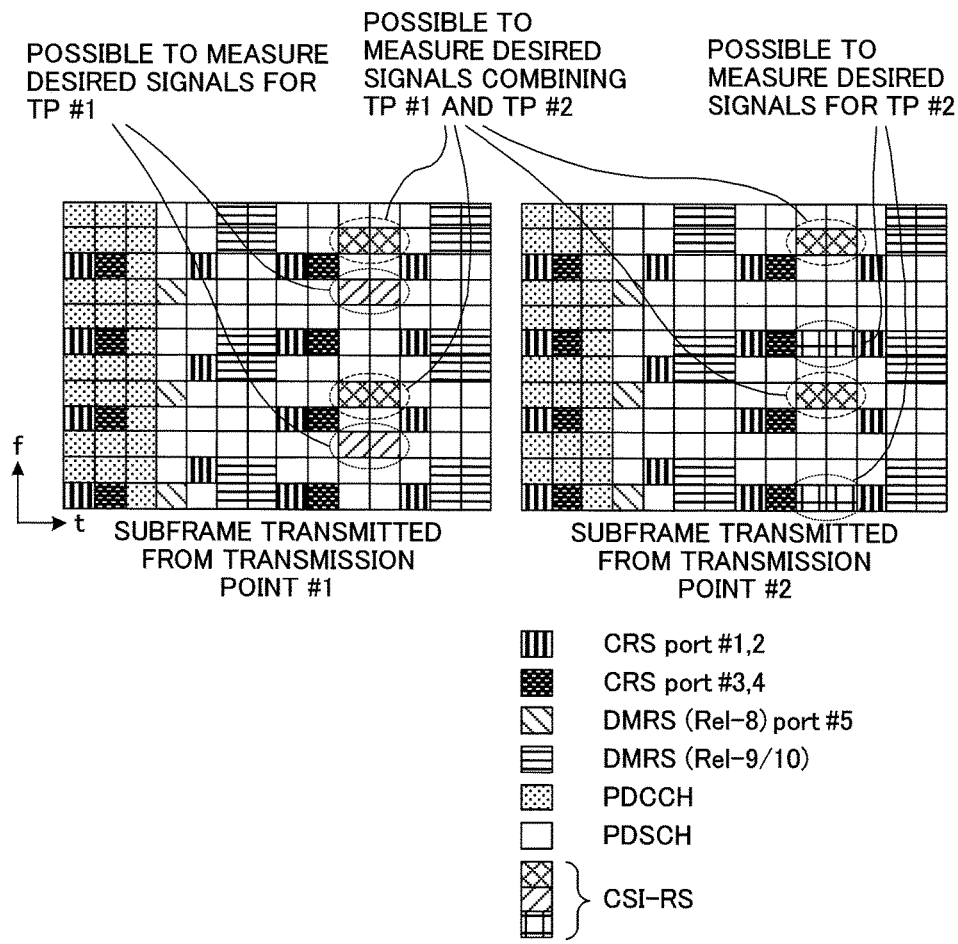
FIG. 3 is a diagram for explaining a method of measuring desired signals.

FIG. 3 shows a case where transmission is carried out from transmission points TP #1 and TP #2 to a user terminal UE. Also, FIG. 3 shows an example of CSI-RS patterns in which CSI-RSs are arranged. In FIG. 3, the subframe on the left side is a subframe to be transmitted from TP #1, and the subframe on the right side is a subframe to be transmitted from TP #2.

As shown in FIG. 3, if, in each subframe of TP #1 and TP #2, CSI-RSs are arranged in the REs that are the second and eighth REs in the frequency direction and that are the tenth and eleventh REs in the time direction, in these REs, it is possible to measure desired signals combining TP #1 and TP #2. Also, as shown in FIG. 3, if, in the subframe of TP #1, CSI-RSs are arranged in the REs that are the fourth and tenth REs in the frequency direction and that are the tenth and eleventh REs in the time direction, in these REs, it is possible to measure desired signals for TP #1. Also, as shown in FIG. 3, if, in the subframe of TP #2, CSI-RSs are arranged in the REs that are the sixth and twelfth REs in the frequency direction and that are the tenth and eleventh REs in the time direction, in these REs, it is possible to measure desired signals for TP #2.

In this way, there are a plurality of methods of measuring interference signals and measuring desired signals, so that a plurality of types of desired signal-to-interference signal measurement results (Signal-to-Interference Ratio: SIR) can be achieved. The present inventors have focused on this point, and arrived at the present invention upon finding out that, when there are a plurality of transmission points (as in coordinated multiple point transmission/reception (CoMP), for example), it is possible to allow a user terminal to feed back optimal quality information (CSI, which is, for example, CQI (Channel Quality Indicator)), by selecting an optimal desired signal-to-interference signal measurement method (the method of measuring desired signal-to-interference signal, to use in CSI measurement) depending on the mode of transmission, and, as a result of this, improve the throughput of the system and improve the efficiency of the system.

That is, a gist of the present invention is to, in each base station apparatus, determine resource information about the resources to allocate the reference signals for measuring desired signals to and the resources for measuring interference signals, and report the resource information to a user terminal, and, in the user terminal, receive the reported resource information, measure desired signals and interference signals based on the resource information, and measure the channel state using the measurement results in the measurement section, thereby allowing the user terminal to feed back channel quality information that is optimal for a mode of transmission from a plurality of transmission points. By this means, it is possible to improve throughput and realize a highly efficient wireless communication system.

For example, CoMP transmission is a transmission mode from a plurality of transmission points. First, downlink CoMP transmission will be described. Downlink CoMP transmission includes coordinated scheduling/coordinated beamforming, and joint processing. Coordinated scheduling/coordinated beamforming refers to the method of transmitting a shared data channel to one user terminal UE from only one cell, and allocates radio resources in the frequency/space domain taking into account interference from other cells and interference against other cells. Meanwhile, joint processing refers to the method of applying precoding and transmitting a shared data channel from a plurality of cells simultaneously, and includes joint transmission to transmit a shared data channel from a plurality of cells to one user terminal UE, and dynamic point selection (DPS) to select one cell instantaneously and transmit a shared data channel. There is also a transmission mode referred to as dynamic point blanking (DPB), which stops data transmission in a certain region with respect to a transmission point that causes interference.

With the present invention, an optimal method for measuring desired signals and a method for measuring interference signals are selected in accordance with a mode of transmission from a plurality of transmission points. First, the measurement method to be used when joint transmission-type CoMP is applied will be described using FIG. 4.

Figure 4A:
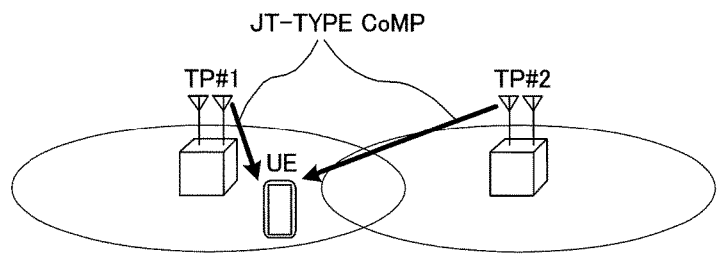
FIG. 4 provides diagrams for explaining an example of CSI measurement.
Figure 4B:
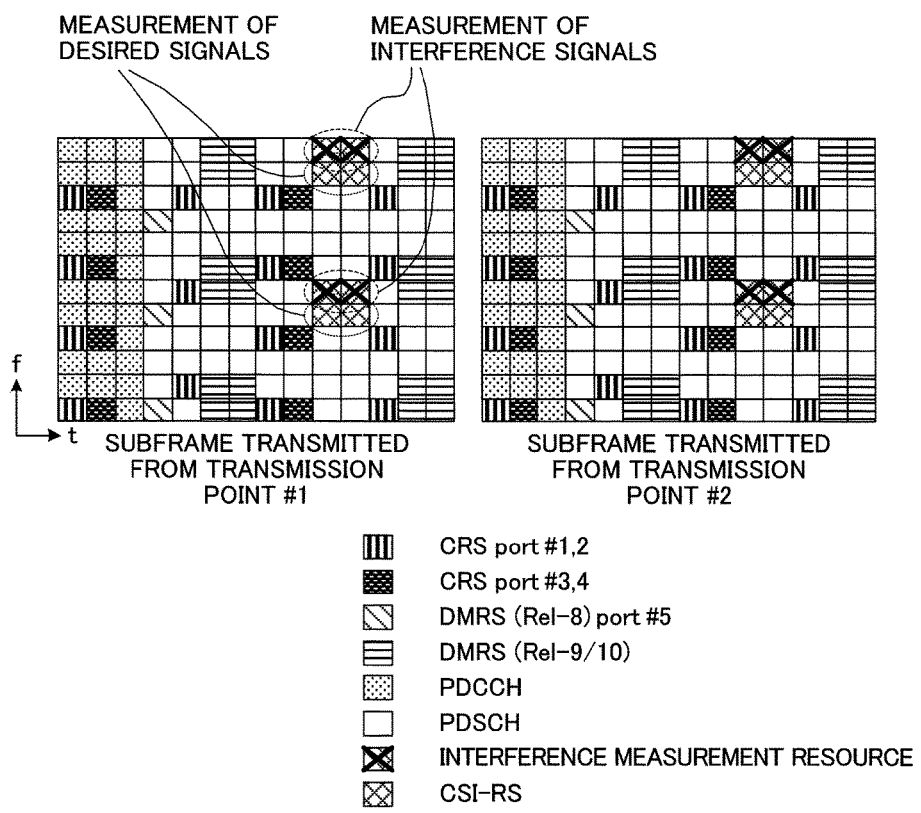

As shown in FIG. 4A, in joint transmission-type CoMP transmission, shared data channel signals are transmitted from a plurality of cells (TP #1 (connecting cell) and TP #2 (coordinated cell)) to one user terminal UE. Consequently, as for desired signals, it is preferable to measure desired signals combining TP #1 and TP #2. Also, as for interference signals, it is preferable to measure interference signals from cells (transmission points) other than TP #1 and TP #2. Consequently, as shown in FIG. 4B, to measure interference signals, in each subframe of TP #1 and TP #2, interference measurement zero power CSI-RSs are arranged in the REs that are the first and seventh REs in the frequency direction and that are the tenth and eleventh REs in the time direction (that is, interference measurement zero power CSI-RSs are arranged in the same REs between the connecting cell (transmission point) and the coordinated cell (transmission point)), and interference signals from cells other than TP #1 and TP #2 are measured. Meanwhile, to measure desired signals, in each subframes of TP #1 and TP #2, CSI-RSs are arranged in the REs that are the second and eighth REs in the frequency direction and that are the tenth and eleventh REs in the time direction (that is, CSI-RSs are arranged in the same REs between the connecting cell (transmission point) and the coordinated cell (transmission point)), and desired signals combining TP #1 and TP #2 are measured.

Figure 5A:
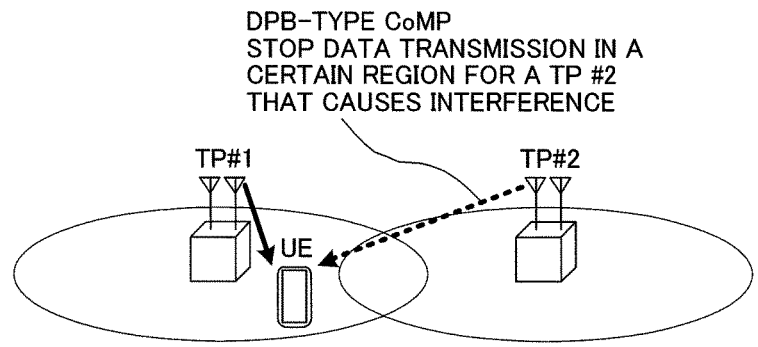
FIG. 5 provides diagrams for explaining an example of CSI measurement.
Figure 5B:
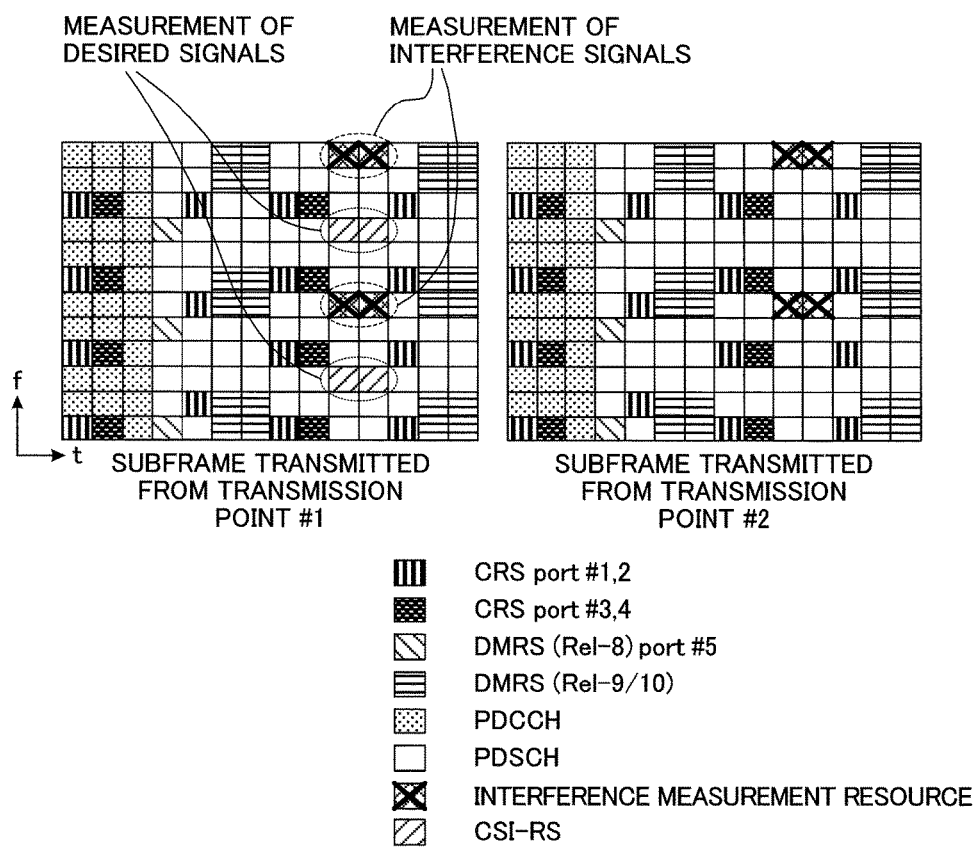

Next, the measurement method to be used when dynamic point blanking-type CoMP is applied will be described using FIG. 5. As shown in FIG. 5A, in dynamic point blanking-type CoMP transmission, data transmission for a transmission point that causes interference (in FIG. 5A, TP #2 (the coordinated cell (transmission point))) is stopped in a certain region. Consequently, as for desired signals, it is preferable to measure desired signals of TP #1 (the connecting cell (transmission point)). Also, as for interference signals, it is preferable to measure interference signals from cells other than TP #1 and TP #2. Consequently, as shown in FIG. 5B, to measure interference signals, in each subframe of TP #1 and TP #2, interference measurement zero power CSI-RSs are arranged in the REs that are the first and seventh REs in the frequency direction and that are the tenth and eleventh REs in the time direction (that is, interference measurement zero power CSI-RSs are arranged in the same REs between the connecting cell (transmission point) and the coordinated cell (transmission point)), and interference signals from cells other than TP #1 and TP #2 are measured. On the other hand, to measure desired signals, in the subframe of TP #1, CSI-RSs are arranged in the REs that are the fourth and tenth REs in the frequency direction and that are the tenth and eleventh REs in the time direction (that is, CSI-RSs are arranged in the REs of the connecting cell (transmission point)), and desired signals of TP #1 are measured.

Figure 6A:
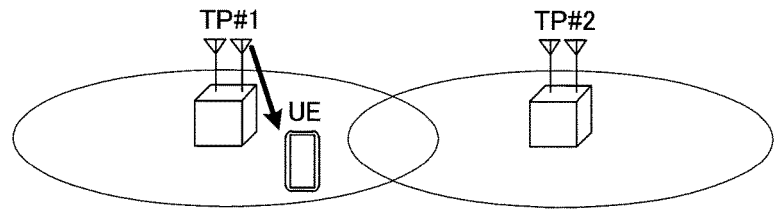
FIG. 6 provides diagrams for explaining an example of CSI measurement.
Figure 6B:
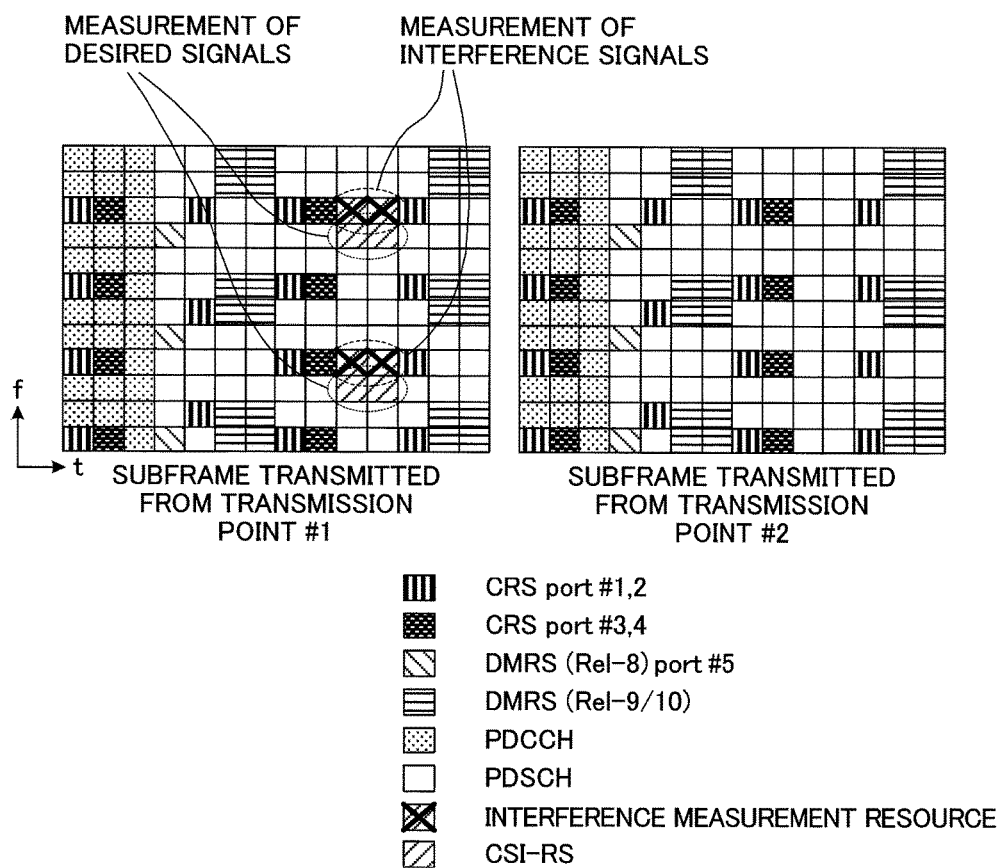

Next, the measurement method to be used when CoMP is not applied will be described using FIG. 6. FIG. 6A shows single-cell transmission to carry out transmission to a user terminal from one transmission point TP #1. Consequently, as for desired signals, it is preferable to measure desired signals of TP #1 (the connecting cell (transmission point)). Also, as for interference signals, it is preferable to measure interference signals from cells other than TP #1. Consequently, as shown in FIG. 6B, to measure interference signals, in the subframe of TP #1, interference measurement zero-power CSI-RSs are arranged in the REs that are the third and ninth REs in the frequency direction and that are the tenth and eleventh REs in the time direction (that is, interference measurement zero power CSI-RSs are arranged in the REs of the connecting cell (transmission point)), and interference signals of cells other than TP #1 are measured. Meanwhile, to measure desired signals, in the subframe of TP #1, CSI-RSs are arranged in the REs that are the fourth and tenth REs in the frequency direction and that are the tenth and eleventh REs in the time direction (CSI-RSs are arranged in the REs of the connecting cell (transmission point)), and desired signals of TP #1 are measured.

In this way, according to the present invention, when there are a plurality of transmission points, an optimal desired signal-to-interference signal measurement method (the method of measuring desired signal-to-interference signal, to use in CSI measurement) is selected depending on the mode of transmission, so that it is possible to allow a user terminal to feed back optimal quality information (CQI), and, as a result, improve the throughput of the system and improve the efficiency of the system.

In this case, information about the method of measuring desired signals and the method of measuring interference signals is signaled from a radio base station to a user terminal. That is to say, to a user terminal, a radio base station signals information about the REs to use for the measurement of desired signals (Signal Measurement Resources: SMRs), information about the REs to use for the measurement of interference signals (Interference Measurement Resources: IMRs), and information about the combinations of SMRs and IMRs (one or a plurality of these pieces of information are signaled as resource information about the resources to allocate reference signals for measuring desired signals to and the resources for measuring interference signals). These pieces of information may also be reported from a radio base station to a user terminal through higher layer signaling (RRC signaling), or may be reported from a radio base station to a user terminal dynamically through downlink control information (DCI). For example, as shown in FIG. 5A, when dynamic point blanking-type CoMP is applied, when it is desirable to feed back CSI, as shown in FIG. 5B, that is, signaling is sent semi-statically or dynamically from a radio base station to a user terminal so that, in each subframe of TP #1 and TP #2, the REs that are the first and seventh REs in the frequency direction and that are the tenth and eleventh REs in the time direction are used to measure interference signals, and, in the subframe of TP #1, the REs that are the fourth and tenth REs in the frequency direction and that are the tenth and eleventh REs in the time direction are used to measure desired signals.

Figure 7:
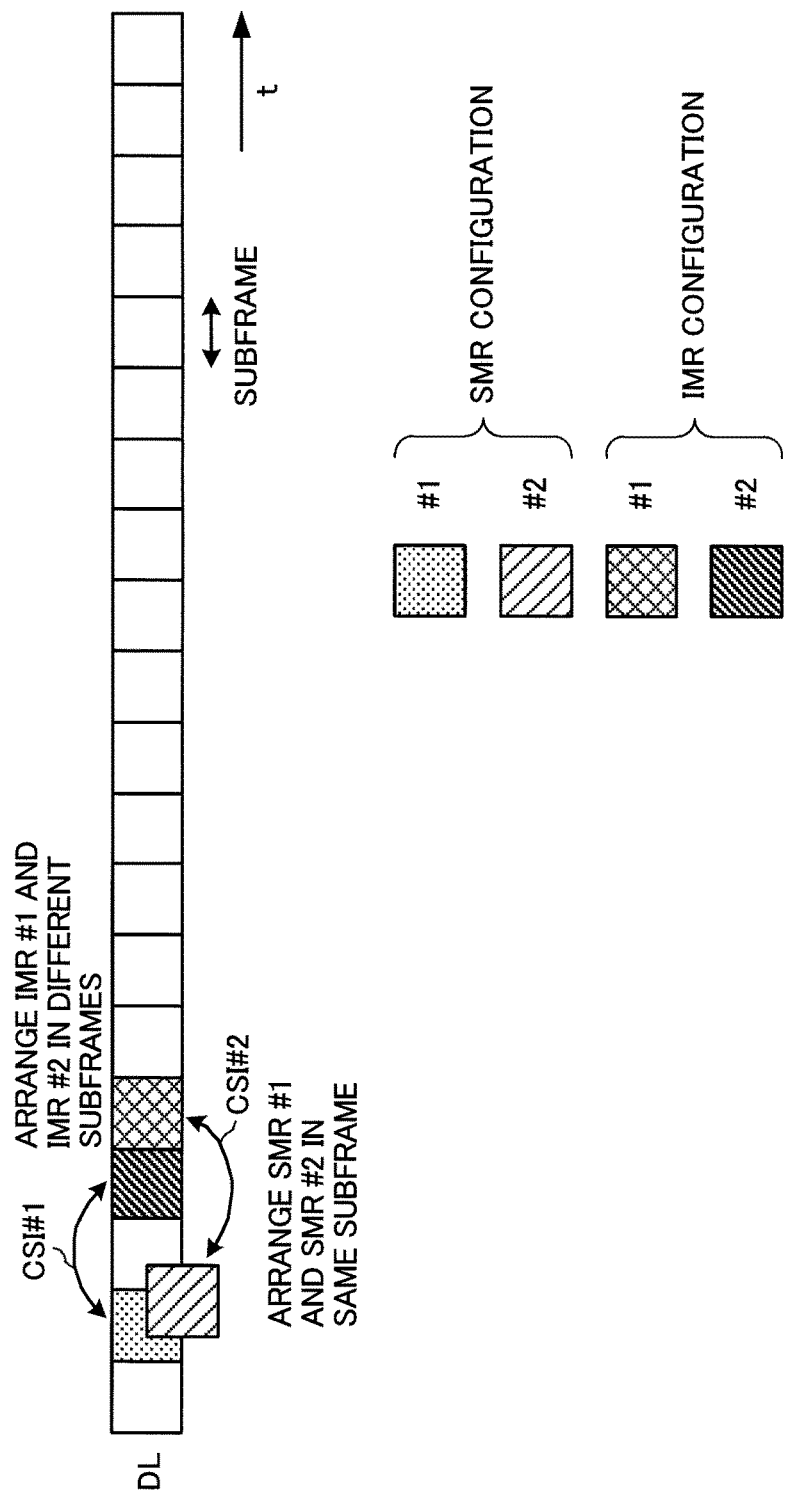
FIG. 7 is a diagram to show subframes including resources for measuring desired signals and resources for measuring interference signals.

By setting a plurality of combinations of SMRs and IMRs such as above, it becomes possible to allow a user terminal to feed back a plurality of types of CSIs. In this case, one or a plurality of SMRs and one or a plurality of IMRs are arranged in the same subframe or in different subframes (configuration). For example, as shown in FIG. 7, when there are two types of SMRs and IMRs (SMR #1, SMR #2, IMR #1 and IMR #2) and SMR #1 and SMR #2 are present in the same subframe and IMR #1 and IMR #2 are present in different subframes, signaling (CSI #1) to the effect of finding CSI with the combination of SMR #1 and IMR #1, and signaling (CSI #2) to the effect of finding CSI with the combination of SMR #2 and IMR #2 are reported from a radio base station to a user terminal, so that it becomes possible to allow the user terminal to feed back two kinds of CSIs (CSI #1 and CSI #2). Also, when there are two types of SMRs and IMRs (SMR #1, SMR #2, IMR #1 and IMR #2) and the SMRs and IMRs are present in the same subframe, signaling (CSI #1) to the effect of finding CSI with the combination of SMR #1 and IMR #1, and signaling (CSI #2) to the effect of finding CSI from the combination of SMR #2 and IMR #2 are reported from a radio base station to a user terminal, so that it becomes possible to allow the user terminals to feed back two kinds of CSIs (CSI #1 and CSI #2). Note that the patterns of arranging one or a plurality of SMRs and one or a plurality of IMRs in the same subframe or in different subframes are not particularly limited.

When combinations of SMRs and IMRs are reported, for example, if there are SMR #1, IMR #1 and IMR #2, as shown in FIG. 8, it is possible to send signaling in two bits. In FIG. 8, the bits "10" are used when measuring CSI with SMR #1+IMR #1, the bits "01" are used when measuring CSI with SMR #2+IMR #2, the bits "11" are used when measuring two types of CSIs with SMR #1+IMR #1 and SMR #1+IMR #2, and the bits "00" are used when measuring CSI with SMR #1 and a conventional interference measurement method (for example, interference measurement using CRSs). Note that FIG. 8 does not limit the relationship between the combinations of SMRs and IMRs and the bits.

Also, when combinations of SMRs and IMRs are reported, if, for example, there are SMR #1, SMR #2, IMR #1 and IMR #2, it is possible to send signaling in four bits, as shown in FIG. 9. In FIG. 9, the bits "1010" are used when measuring CSI with SMR #1+IMR #1, the bits "0101" are used when measuring CSI with SMR #2+IMR #2, the bits "1000" are used when measuring CSI with SMR #1 and a conventional interference measurement method (for example, interference measurement using CRSs), the bits "1011" are used when measuring two types of CSIs with SMR #1+IMR #1 and SMR #1+IMR #2, the bits "1101" are used when measuring two types of CSIs with SMR #1+IMR #2 and SMR #2+IMR #2, and the bits "1111" are used when measuring four types of CSIs with SMR #1+IMR #1, SMR #1+IMR #2, SMR #2+IMR #1, and SMR #2+IMR #2. Note that FIG. 9 by no means limits the relationship between the combinations of SMRs and IMRs and the bits.

A user terminal measures desired signals and interference signals using the REs that are specified by the SMR information, the IMR information, and the information about the combinations of SMRs and IMRs that are reported, and finds one or a plurality of CSIs using the measurement results. The user terminal feeds back one or a plurality of CSIs found in this way to a radio base station. Also, when the user terminal finds CSI, the subframes to find interference signals in may be limited based on bitmap information reported from the radio base station through higher layer signaling (for example, RRC signaling). In this case, the user terminal finds CSI using the signaling of combinations of SMRs and IMRs and the signaling to limit the subframes to find interference signals in.

Figure 10:
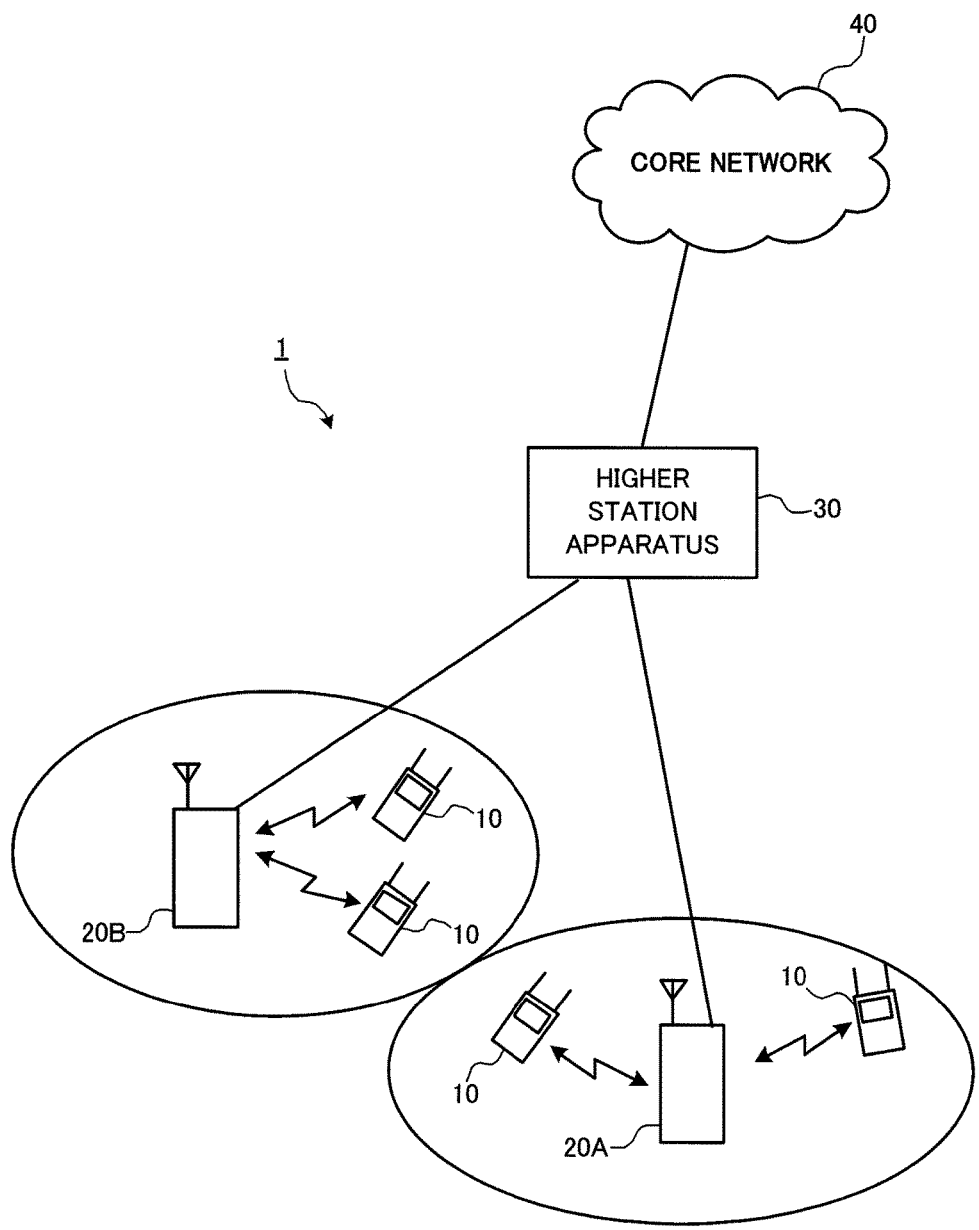
FIG. 10 is a diagram to explain a system configuration of a wireless communication system.

Now, a wireless communication system according to an embodiment of the present invention will be described in detail. FIG. 10 is a diagram to explain a system configuration of a wireless communication system according to the present embodiment. Note that the wireless communication system shown in FIG. 10 is a system to accommodate, for example, an LTE system or SUPER 3G. In this wireless communication system, carrier aggregation to group a plurality of fundamental frequency blocks into one, where the system band of the LTE system is one unit, is used. Also, this wireless communication system may be referred to as "IMT-Advanced" or may be referred to as "4G."

As shown in FIG. 10, a wireless communication system 1 is configured to include base station apparatuses 20A and 20B of individual transmission points, and user terminals 10 that communicate with these base station apparatuses 20A and 20B. The base station apparatuses 20A and 20B are connected with a higher station apparatus 30, and this higher station apparatus 30 is connected with a core network 40. Also, the base station apparatuses 20A and 20B are connected with each other by wire connection or by wireless connection. The user terminals 10 are able to communicate with the base station apparatuses 20A and 20B, which are transmission points. Note that the higher station apparatus 30 may be, for example, an access gateway apparatus, a radio network controller (RNC), a mobility management entity (MME) and so on, but is by no means limited to these.

Although the user terminals 10 may include both existing terminals (Rel. LTE) and support terminals (for example, Rel. 11 LTE), the following description will be given simply with respect to "user terminals," unless specified otherwise. Also, for ease of explanation, user terminals 10 will be described to perform radio communication with the base station apparatuses 20A and 20B.

In a wireless communication system 1, as radio access schemes, OFDMA (Orthogonal Frequency Division Multiple Access) is adopted on the downlink, and SC-FDMA (Single-Carrier Frequency Division Multiple Access) is adopted on the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels will be described. Downlink communication channels include a PDSCH (Physical Downlink Shared Channel), which is a downlink data channel used by user terminals 10 on a shared basis, and downlink L1/L2 control channels (PDCCH, PCFICH, and PHICH). Transmission data and higher control information are transmitted by the PDSCH. PDSCH and PUSCH scheduling information and so on are transmitted by the PDCCH (Physical Downlink Control CHannel). The number of OFDM symbols to use for the PDCCH is transmitted by the PCFICH (Physical Control Format Indicator Channel). HARQ ACK/NACK for the PUSCH are transmitted by the PHICH (Physical Hybrid-ARQ Indicator Channel).

Uplink communication channels include a PUSCH (Physical Uplink Shared Channel), which is an uplink data channel used by each user terminal on a shared basis, and a PUCCH (Physical Uplink Control Channel), which is an uplink control channel. By means of this PUSCH, transmission data and higher control information are transmitted. Also, downlink channel state information (CSI (including CQI and so on)), ACK/NACK and so on are transmitted by means of the PUCCH.

Figure 11:
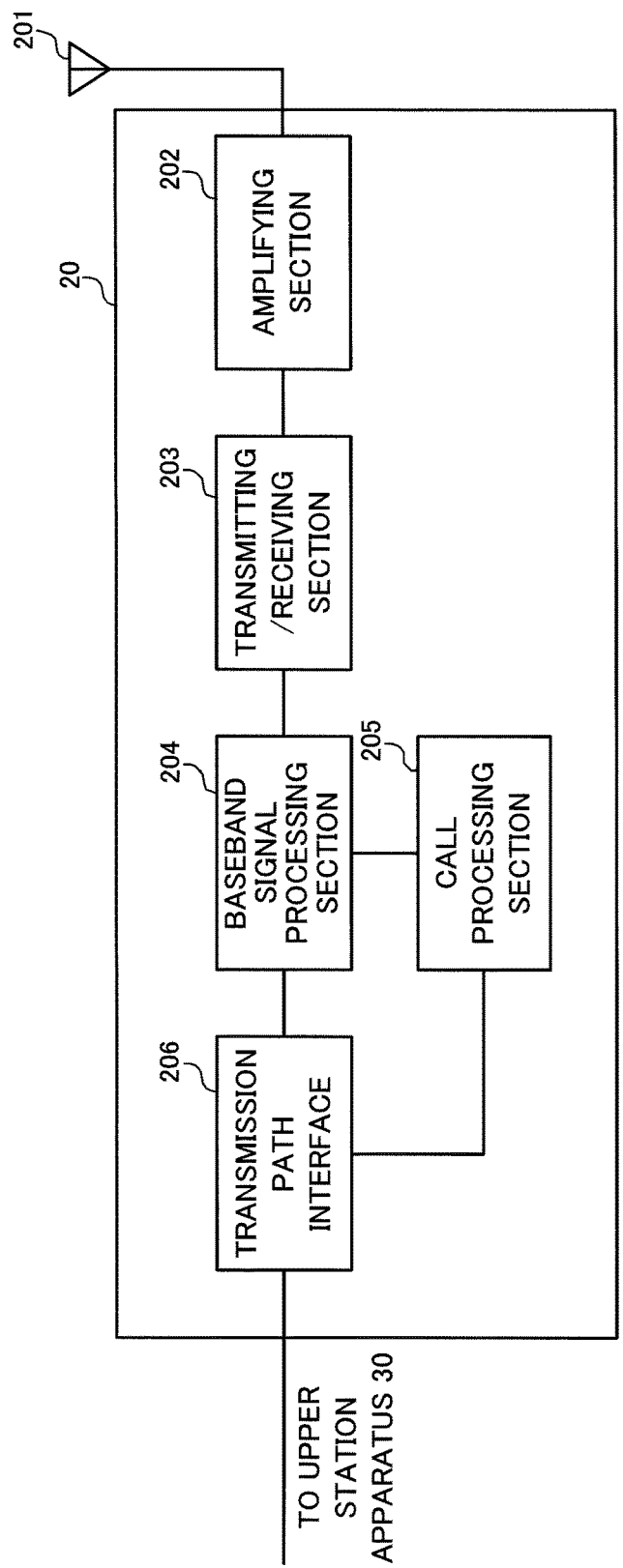
FIG. 11 is a diagram to explain an overall configuration of a base station apparatus.

An overall configuration of a base station apparatus according to the present embodiment will be described with reference to FIG. 11. Note that the base station apparatuses 20A and 20B have the same configuration and therefore will be described simply as "base station apparatus 20." The base station apparatus 20 has a transmitting/receiving antenna 201, an amplifying section 202, a transmitting/receiving section (reporting section) 203, a baseband signal processing section 204, a call processing section 205, and a transmission path interface 206. Transmission data to be transmitted from the base station apparatus 20 to the user terminal on the downlink is input from the higher station apparatus 30 into the baseband signal processing section 204 via the transmission path interface 206.

In the baseband signal processing section 204, a signal of a downlink data channel is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, a signal of a physical downlink control channel, which is a downlink control channel, is also subjected to transmission processes such as channel coding and an inverse fast Fourier transform.

Also, the baseband signal processing section 204 reports control information for allowing each terminal 10 to perform radio communication with the base station apparatus 20, to the user terminals 10 connected to the same transmission point, through a broadcast channel. The information for allowing communication at the transmission point includes, for example, the uplink or downlink system bandwidth, root sequence identification information (root sequence index) for generating random access preamble signals in the PRACH (Physical Random Access Channel), and so on.

The transmitting/receiving section 203 converts a baseband signal that is output from the baseband signal processing section 204 into a radio frequency band. The amplifying section 202 amplifies the radio frequency signal having been subjected to frequency conversion, and outputs the result to the transmitting/receiving antenna 201.

Meanwhile, as for a signal to be transmitted from the user terminal 10 to the base station apparatus 20 on the uplink, a radio frequency signal received by the transmitting/receiving antenna 201 is amplified in the amplifying section 202, converted into a baseband signal through frequency conversion in the transmitting/receiving section 203, and input in the baseband signal processing section 204.

The baseband signal processing section 204 performs an FFT process, an IDFT process, error correction decoding, a MAC retransmission control receiving process, and RLC layer and PDCP layer receiving processes, of the transmission data that is included in the baseband signal received on the uplink. The decoded signal is transferred to the higher station apparatus 30 through the transmission path interface 206.

The call processing section 205 performs call processes such as setting up and releasing communication channels, manages the state of the base station apparatus 20 and manages the radio resources.

Next, an overall configuration of a user terminal according to the present embodiment will be described with reference to FIG. 12. A user terminal 10 has a transmitting/receiving antenna 101, an amplifying section 102, a transmitting/receiving section (receiving section) 103, a baseband signal processing section 104, and an application section 105.

As for downlink data, a radio frequency signal that is received in the transmitting/receiving antenna 101 is amplified in the amplifying section 102, and subjected to frequency conversion and converted into a baseband signal in the transmitting/receiving section 103. This baseband signal is subjected to receiving processes such as an FFT process, error correction decoding and retransmission control, in the baseband signal processing section 104. In this downlink data, downlink transmission data is transferred to the application section 105. The application section 105 performs processes related to higher layers above the physical layer and the MAC layer. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT process, and an IFFT process. The baseband signal that is output from the baseband signal processing section 104 is converted into a radio frequency band in the transmitting/receiving section 103. After that, the amplifying section 102 amplifies the radio frequency signal having been subjected to frequency conversion, and transmits the result from the transmitting/receiving antenna 101.

Figure 13:
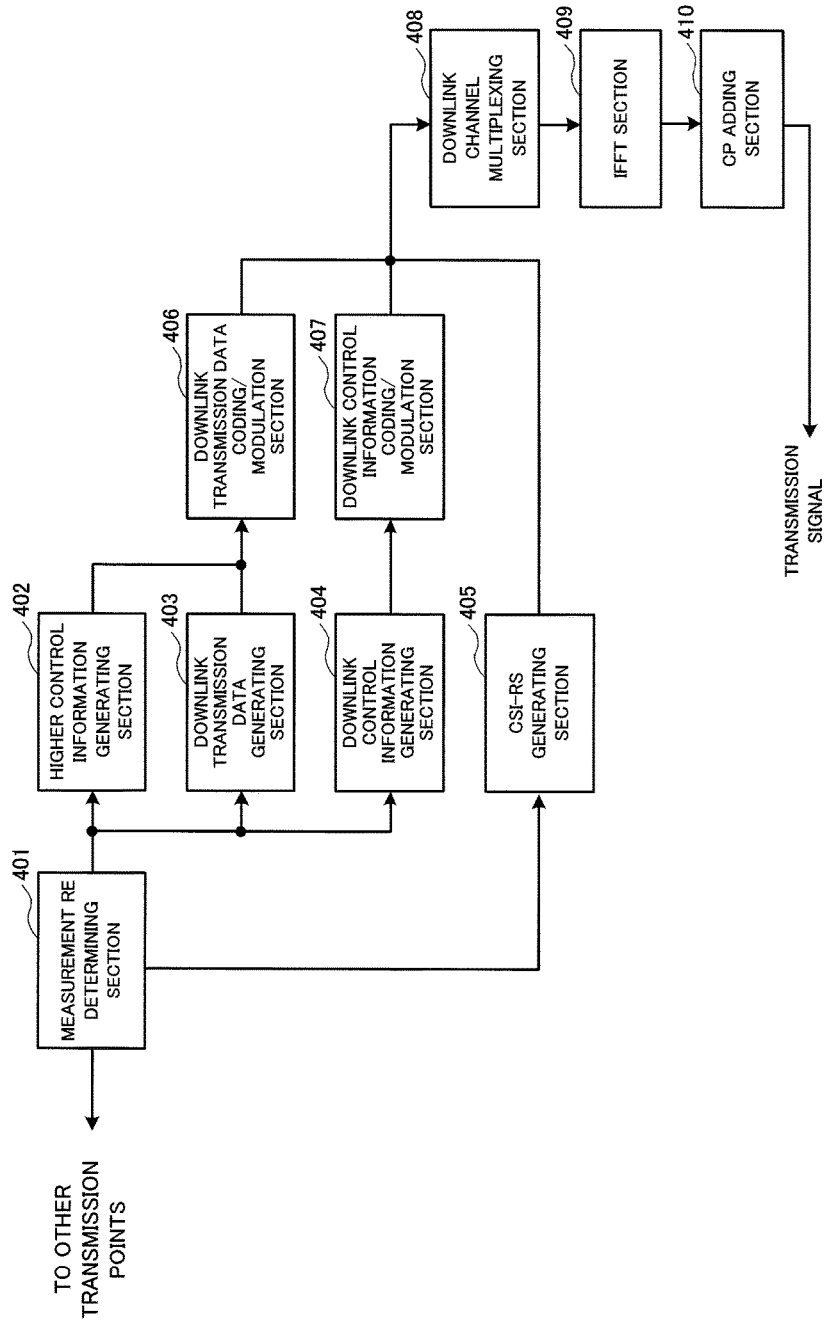
FIG. 13 is a functional block diagram of a base station apparatus.

The function blocks of the base station apparatus pertaining to the process of determining the measurement REs for measuring desired signals and measuring interference signals will be described with reference to FIG. 13. Note that each function block of FIG. 13 primarily relates to the baseband processing section shown in FIG. 11. Also, the functional block diagram of FIG. 13 is simplified to explain the present invention, but is assumed to have configurations which a baseband processing section should normally have.

The base station apparatus 20 has, on the transmitting side, a measurement RE determining section 401, a higher control information generating section 402, a downlink transmission data generating section 403, a downlink control information generating section 404, a CSI-RS generating section 405, a downlink transmission data coding/modulation section 406, and a downlink control information coding/modulation section 407. Also, the base station apparatus 20 has a downlink channel multiplexing section 408, an IFFT section 409, and a CP adding section 410.

The measurement RE determining section 401 determines the resources (measurement REs) to allocate the reference signals (CSI-RSs) for measuring desired signals to, and the resources (measurement REs) for measuring interference signals. Also, the measurement RE determining section 401 determines the combination of the resources (measurement REs) to allocate the reference signals for measuring desired signals to, and the resources (measurement REs) for measuring interference signals. These resources (measurement REs) constitute resource information.

The measurement RE determining section 401 determines the above resource information depending on the transmission mode of a plurality of base station apparatuses (transmission points). For example, when the transmission mode is joint transmission-type coordinated multiple-point transmission, as shown in FIG. 4B, the measurement RE determining section 401 determines, as for desired signals, the resources to measure desired signals combining the connecting transmission point (TP #1) and the coordinated transmission point (TP #2) (in FIG. 4B, the REs that are the second and eighth REs in the frequency direction and that are the tenth and eleventh REs in the time direction in each subframe of TP #1 and TP #2), and determines, as for interference signals, the resources (measurement REs) to measure interference signals from transmission points other than the connecting transmission point (TP #1) and the coordinated transmission point (TP #2) (in FIG. 4B, the REs that are the first and seventh REs in the frequency direction and that are the tenth and eleventh REs in the time direction in each subframe of TP #1 and TP #2).

Also, when the transmission mode is dynamic point blanking-type coordinated multiple-point transmission, as shown in FIG. 5B, the measurement RE determining section 401 determines, as for desired signals, the resources to measure desired signals of the connecting transmission point (TP #1) (in FIG. 5B, the REs that are the fourth and tenth REs in the frequency direction and that are the tenth and eleventh REs in the time direction in the subframe of TP #1), and determines, as for interference signals, the resources (measurement REs) to measure interference signals from transmission points other than the connecting transmission point (TP #1) and the coordinated transmission point (TP #2) (in FIG. 5B, the REs that are the first and seventh REs in the frequency direction and that are the tenth and eleventh REs in the time direction in each subframe of TP #1 and TP #2).

Also, when the transmission mode is single-cell transmission, as shown in FIG. 6B, the measurement RE determining section 401 determines, as for desired signals, the resources to measure desired signals for the connecting transmission point (TP #1) (in FIG. 6B, the REs that are the fourth and tenth REs in the frequency direction and that are the tenth and eleventh REs in the time direction in the subframe of TP #1), and determines, as for interference signals, the resources (measurement REs) to measure interference signals from transmission points other than the connecting transmission point (TP #1) (in FIG. 6B, the REs that are the third and ninth REs in the frequency direction and that are the tenth and eleventh REs in the time direction in the subframe of TP #1).

When this resource information is signaled semi-statically to a user terminal, the resource information is sent to the higher control information generating section 402 for higher layer signaling (for example, RRC signaling). Also, when this resource information is signaled dynamically to a user terminal, the resource information is sent to the downlink control information generating section 404 to be included in downlink control information. Also, this resource information is sent to the CSI-RS generating section 405 to generate CSI-RSs, and furthermore sent to the downlink transmission data generating section 403 to make downlink transmission data zero power (muting) (that is, to arrange interference measurement zero-power CSI-RSs).

The higher control information generating section 402 generates higher control information to be transmitted and received by higher layer signaling (for example, RRC signaling), and outputs the generated higher control information to the downlink transmission data coding/modulation section 406. The higher control information generating section 402 generates higher control information, which includes the resource information output from the measurement RE determining section 401. For example, the higher control information generating section 402 generates information about the combination of the resources (measurement REs) to allocate the reference signals (CSI-RSs) for measuring desired signals to, and the resources (measurement REs) for measuring interference signals, in the form of bit information such as the ones shown in FIG. 8 and FIG. 9.

The downlink transmission data generating section 403 generates downlink transmission data, and outputs this downlink transmission data to the downlink transmission data coding/modulation section 406. The downlink transmission data generating section 403 arranges interference measurement zero-power CSI-RSs (or executes muting) in accordance with the resource information output form the measurement RE determining section 401.

The downlink control information generating section 404 generates downlink control information, and outputs this downlink control information to the downlink control information coding/modulation section 407. When signaling resource information to a user terminal dynamically, the downlink control information generating section 404 generates downlink control information that includes the resource information. The downlink transmission data coding/modulation section 406 performs channel coding and data modulation of the downlink transmission data and the higher control information, and outputs the results to the downlink channel multiplexing section 408. The downlink control information coding/modulation section 407 performs channel coding and data modulation of the downlink control information, and outputs the result to the downlink channel multiplexing section 408.

The CSI-RS generating section 405 generates a CSI-RS in accordance with the resource information output from the measurement RE determining section 401, and outputs this CSI-RS to the downlink channel multiplexing section 408.

The downlink channel multiplexing section 408 combines the downlink control information, the CSI-RS, the higher control information and the downlink transmission data, and generates a transmission signal. The downlink channel multiplexing section 408 outputs the generated transmission signal to the IFFT section 409. The IFFT section 409 applies an inverse fast Fourier transform to the transmission signal and converts the transmission signal from a frequency domain signal to a time domain signal. The transmission signal after the IFFT is output to a CP adding section 410. The CP adding section 410 adds CPs (Cyclic Prefixes) to the transmission signal after the IFFT, and outputs the transmission signal, to which CPs have been added, to the amplifying section 202 shown in FIG. 11.

Figure 14:
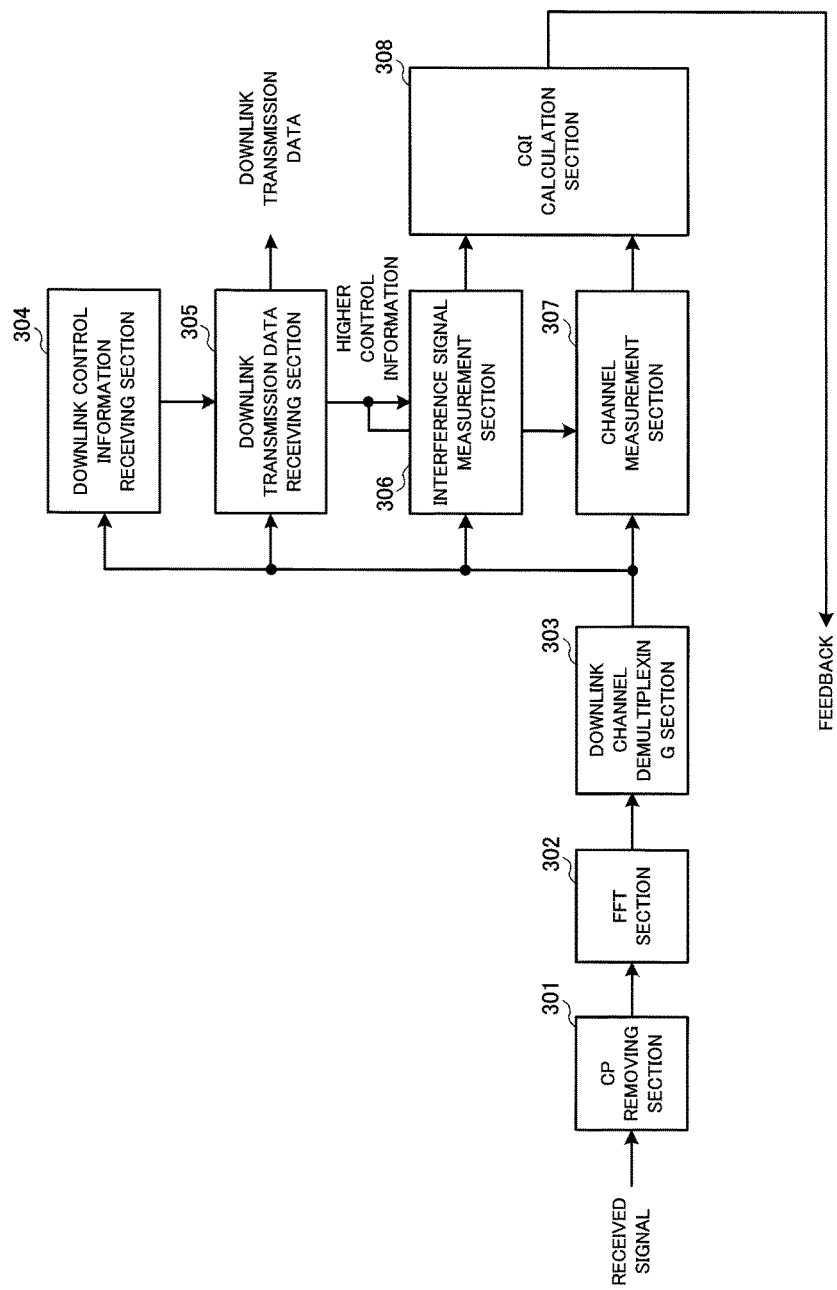
FIG. 14 is a functional block diagram of a user terminal.

Now, the function blocks of a user terminal pertaining to the channel state measurement process according to the present invention will be described with reference to FIG. 14. Note that each function block of FIG. 14 primarily relates to the baseband processing section 104 shown in FIG. 12. Also, the function blocks of FIG. 12 are simplified to explain the present invention, but are assumed to have configurations which a baseband processing section should normally have.

The user terminal 10 has, on the receiving side, a CP removing section 301, an FFT section 302, a downlink channel demultiplexing section 303, a downlink control information receiving section 304, a downlink transmission data receiving section 305, an interference signal measurement section 306, a channel measurement section 307, and a CQI calculation section 308.

Figure 12:
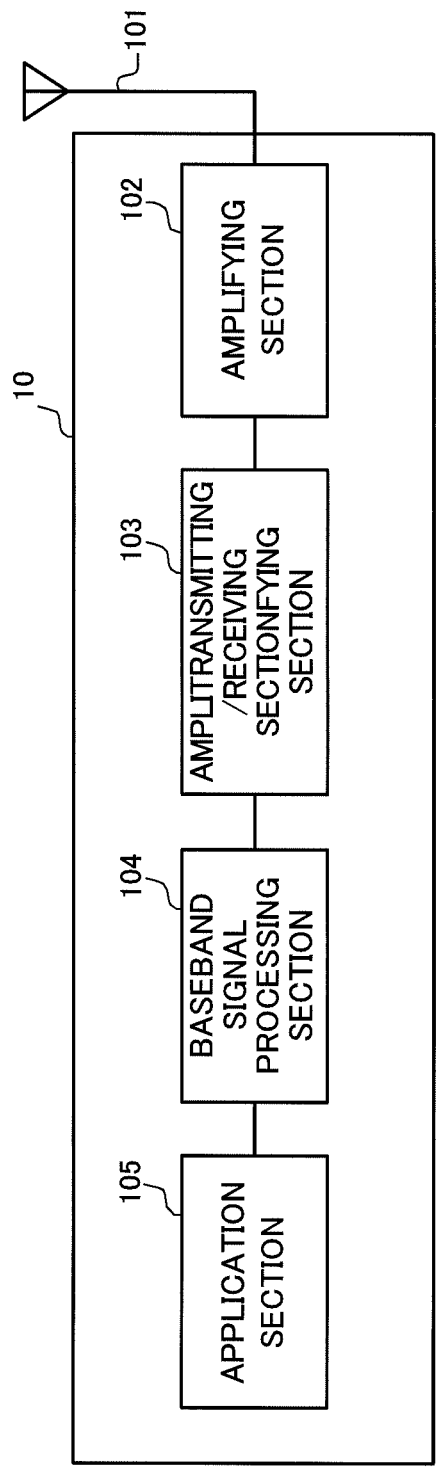
FIG. 12 is a diagram to explain an overall configuration of a user terminal.

A transmission signal that is transmitted from the base station apparatus 20 is received in the transmitting/receiving antenna 101 shown in FIG. 12, and output to the CP removing section 301. The CP removing section 301 removes the CPs from the received signal and outputs the result to the FFT section 302. The FFT section 302 performs a fast Fourier transform (FFT) of the signal, from which the CPs have been removed, and converts the time domain signal into a frequency domain signal. The FFT section 302 outputs the signal having been converted into a frequency domain signal to the downlink channel demultiplexing section 303.

The downlink channel demultiplexing section 303 demultiplexes the downlink channel signal into the downlink control information, the downlink transmission data, and the CSI-RS. The downlink channel demultiplexing section 303 outputs the downlink control information to the downlink control information receiving section 304, outputs the downlink transmission data and the higher control information to the downlink transmission data receiving section 305, and outputs the CSI-RS to the channel measurement section 307.

The downlink control information receiving section 304 demodulates the downlink control information, and outputs the demodulated downlink control information to the downlink transmission data receiving section 305. The downlink transmission data receiving section 305 demodulates the downlink transmission data using the demodulated downlink control information. At this time, the downlink transmission data receiving section 305 specifies the desired signal measurement REs (CSI-RS resources) and the interference signal measurement REs based on the resource information included in the higher control information. The downlink transmission data receiving section 305 demodulates the user data, not including the desired signal measurement REs (CSI-RS resources) and the interference signal measurement REs. Also, the downlink transmission data receiving section 305 outputs the higher control information included in the downlink transmission data, to the interference signal measurement section 306.

The interference signal measurement section 306 measures interference signals in the interference signal measurement REs based on the resource information included in the higher control information (or downlink control information).

When, for example, the transmission mode is joint transmission-type coordinated multiple-point transmission, as shown in FIG. 4B, the interference signal measurement section 306 measures interference signals with the REs that are the first and seventh REs in the frequency direction and that are the tenth and eleventh REs in the time direction, in each subframe of TP #1 and TP #2. Also, when, for example, the transmission mode is dynamic point blanking-type coordinated multiple-point transmission, as shown in FIG. 5B, the interference signal measurement section 306 measures interference signals with the REs that are the first and seventh REs in the frequency direction and that are the tenth and eleventh REs in the time direction, in each subframe of TP #1 and TP #2. Also, when, for example, the transmission mode is single-cell transmission, as shown in FIG. 6B, the interference signal measurement section 306 measures interference signals with the REs that are the third and ninth REs in the frequency direction and that are the tenth and eleventh REs in the time direction, in the subframe of TP #1.

The interference signal measurement section 306 measures interference signals in this way, and averages the measurement results of all resource blocks. The averaged interference signal measurement result is reported to the CQI calculation section 308.

The channel measurement section 307 specifies the desired signal measurement REs (CSI-RS resources) based on the resource information included in the higher control information (or downlink control information), and measures desired signals with the desired signal measurement REs (CSI-RS resources).

When, for example, the transmission mode is joint transmission-type coordinated multiple-point transmission, as shown in FIG. 4B, the channel measurement section 307 measures desired signals with the REs that are the second and eighth REs in the frequency direction and that are the tenth and eleventh REs in the time direction in the each subframe of TP #1 and TP #2. Also, when, for example, the transmission mode is dynamic point blanking-type coordinated multiple-point transmission, as shown in FIG. 5B, the channel measurement section 307 measures desired signals with the REs that are the fourth and tenth REs in the frequency direction and that are the tenth and eleventh REs in the time direction in the subframe of TP #1. Also, when, for example, the transmission mode is single-cell transmission, as shown in FIG. 6B, the channel measurement section 307 measures desired signals in the REs that are the fourth and tenth REs in the frequency direction and that are the tenth and eleventh REs in the time direction in the subframe of TP #1.

The channel measurement section 307 reports channel measurement values to the CQI calculation section 308. The CQI calculation section 308 calculates the channel state (CQI) based on the interference measurement result reported from the interference signal measurement section 306, the channel measurement result reported from the channel measurement section 307, and the feedback mode. Note that the feedback mode may be set to any one of wideband CQI, subband CQI, and best-M average. The CQI calculated in the CQI calculation section 308 is reported to the base station apparatus 20 as feedback information.

In the above description, the CSI-RS patterns shown in FIG. 1 to FIG. 6 follow the CSI-RS patterns defined in LTE-A (Rel. 10 LTE) on an as-is basis (in other words, "re-use" them). Consequently, it is possible to signal the resources to be muted to existing terminals (Rel. 10 LTE) within the range of the capacities of the terminals (the functions which the terminals support).

The present invention is by no means limited to the above embodiment and can be implemented in various modifications. For example, it is possible to adequately change the positions to set CSI-RSs, the positions to set muting (hence zero power), the number of processing sections, the order of processes, the number of CSI-RSs, the count of muting, and the number of transmission points in the above description, without departing from the scope of the present invention, and still implement these. Also, although a case has been described above where a plurality of transmission points are a plurality of radio base stations, a transmission point may be an antenna as well. Besides, the present invention can be implemented with various changes, without departing from the scope of the present invention.

The disclosure of Japanese Patent Application No. 2012-017278, filed on Jan. 30, 2012, including the specification, drawings, and abstract, is incorporated herein by reference in its entirety.

The invention claimed is:

1. A wireless communication system comprising:
a base station apparatus that transmits a reference signal for measuring a channel state; and
a user terminal that connects with the base station apparatus, wherein:
a transmission mode is coordinated multiple-point transmission,
the base station apparatus comprises a first processor and a first memory, and
the first processor:
determines resource information about a set of two resource elements for the reference signal including a reference signal for measuring a non-zero power channel state (non-zero power CSI-RS) and a set of two resource elements for interference measurements including a reference signal for measuring a zero power channel state (zero power CSI-RS); and
reports the resource information to the user terminal; and
the user terminal comprises a second processor and a second memory, and
the second processor:
uses the resource information as a basis to derive channel measurements using the resource elements for the reference signal and derive interference measurements using the resource elements for interference measurements; and
calculates a channel quality using the channel measurements and the interference measurements.

2. The wireless communication system according to claim 1, wherein the resource elements for the zero power CSI-RS for the interference measurements do not overlap between transmission points.

3. The wireless communication system according to claim 2, wherein, when the transmission mode is joint transmission-type coordinated multiple-point transmission, the resource elements for the reference signal is determined to measure a desired signal combining a connecting transmission point and a coordinated transmission point, and the resource elements for interference measurements is determined to measure interference from a transmission point other than the connecting transmission point and the coordinated transmission point.

4. The wireless communication system according to claim 2, wherein, when the transmission mode is dynamic point blanking-type coordinated multiple-point transmission, the resource elements for the reference signal is determined to measure a desired signal of a connecting transmission point, and the resource elements for interference measurements is determined to measure interference from a transmission point other than the connecting transmission point and a coordinated transmission point.

5. The wireless communication system according to claim 1, wherein the resource information is signaled by higher layers.

6. The wireless communication system according to claim 2, wherein the resource information is signaled by higher layers.

7. The wireless communication system according to claim 3, wherein the resource information is signaled by higher layers.

8. The wireless communication system according to claim 4, wherein the resource information is signaled by higher layers.

9. A base station apparatus in a wireless communication system comprising the base station apparatus that transmits a reference signal for measuring a channel state and a user terminal that connects with the base station apparatus,
a transmission mode being coordinated multiple-point transmission,
the base station apparatus comprising a processor and a memory, wherein the processor:
determines resource information about a set of two resource elements for the reference signal including a reference signal for measuring a non-zero power channel state and a set of two resource elements for interference measurements including a reference signal for measuring a zero power channel state; and reports the resource information to the user terminal.

10. A user terminal in a wireless communication system comprising a base station apparatus that transmits a reference signal for measuring a channel state, and the user terminal that connects with the base station apparatus, a transmission mode being coordinated multiple-point transmission, and the user terminal comprising a processor and a memory, wherein the processor:

uses resource information about a set of two resource elements for the reference signal including a reference signal for measuring a non-zero power channel state and a set of two resource elements for interference measurements including a reference signal for measuring a zero power channel state as a basis to derive channel measurements using the resource elements for the reference signal including a reference signal for measuring a non-zero power channel state and derive interference measurements using the resource elements for interference measurements including a reference signal for measuring a zero power channel state; and calculates a channel quality using the channel measurements and the interference measurements.

11. A channel state information measurement method in a wireless communication system comprising a base station apparatus that transmits a reference signal for measuring a channel state and a user terminal that connects with the base station apparatus, a transmission mode being coordinated multiple-point transmission, and the channel state information measurement method comprising:

at the base station apparatus, determining resource information about a set of two resource elements for the reference signal including a reference signal for measuring a non-zero power channel state and a set of two resource elements for interference measurements including a reference signal for measuring a zero power channel state; and reporting the resource information to the user terminal; and at the user terminal, using the information as a basis to derive channel measurements using the resource elements for the reference signal and derive interference measurements using the resource elements for interference measurements; and calculating a channel quality using the channel measurements and the interference measurements.

* * * * *

UNITED STATES PATENT AND TRADEMARK OFFICE
CERTIFICATE OF CORRECTION

| | |
|---|---|
| PATENT NO. | : 10,057,040 B2 |
| APPLICATION NO. | : 14/375151 |
| DATED | : August 21, 2018 |
| INVENTOR(S) | : Nagata et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 409 days.

Signed and Sealed this
Seventh Day of February, 2023

Katherine Kelly Vidal
*Director of the United States Patent and Trademark Office*